July 25, 1967 R. W. G. SOMERVELL ET AL 3,332,634
DRIVE REVERSING MECHANISM
Filed June 3, 1965 4 Sheets-Sheet 1
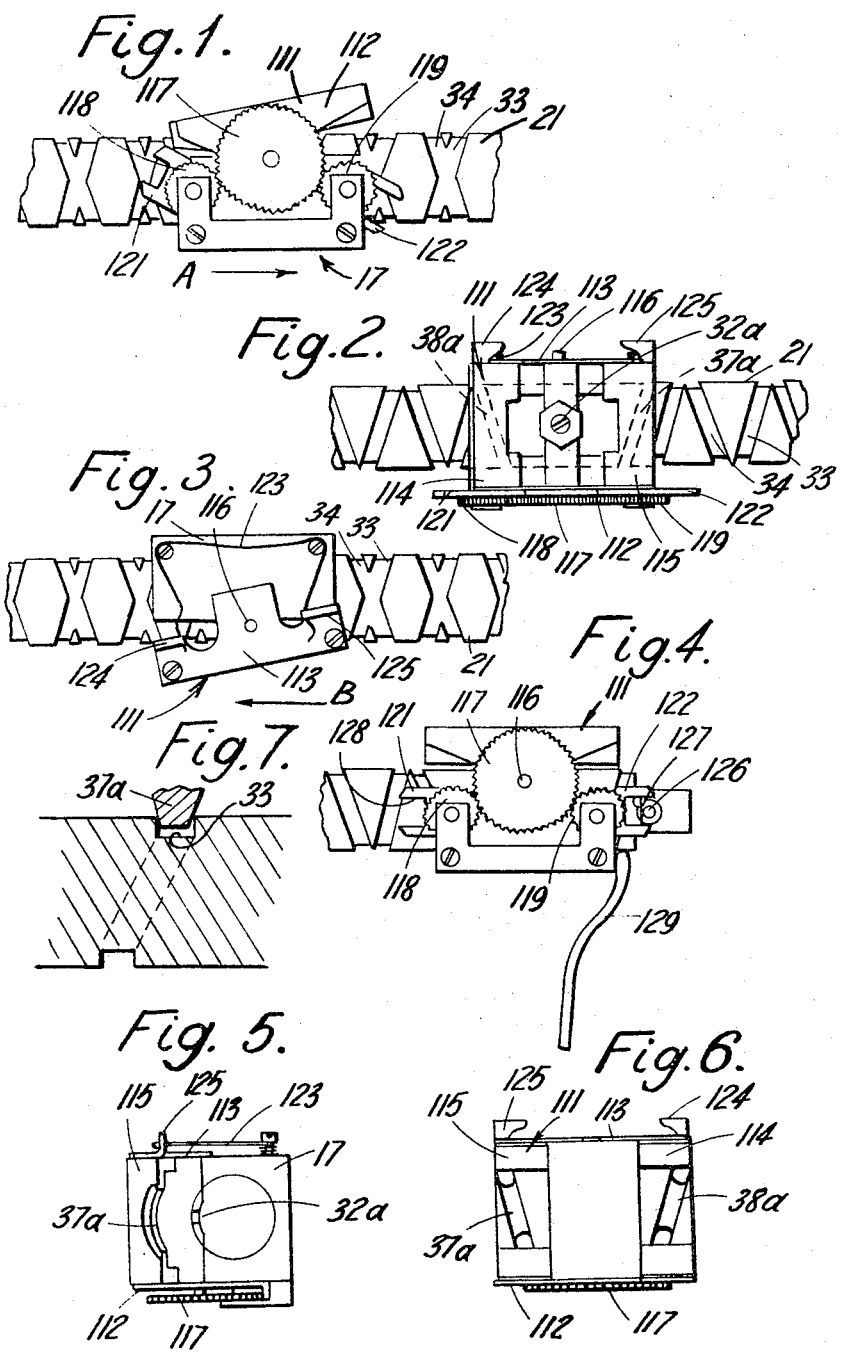

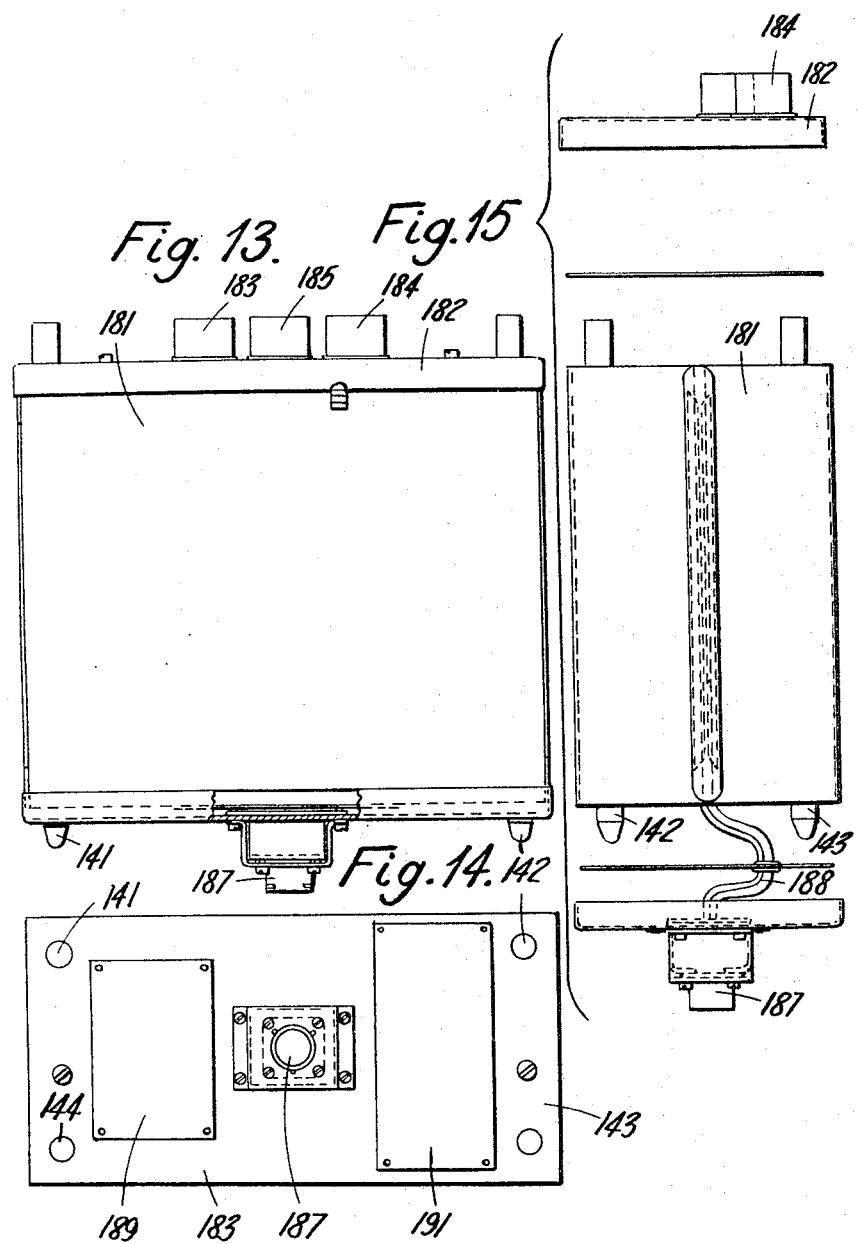

United States Patent Office 3,332,634
Patented July 25, 1967

3,332,634
DRIVE REVERSING MECHANISM
Roland William Gordon Somervell, Beaconsfield, and Alan F. Woods, Greenford, England, assignors to S. Davall & Sons Limited, Greenford, Middlesex, England
Filed June 3, 1965, Ser. No. 461,138
Claims priority, application Great Britain, July 4, 1964, 23,262/64
8 Claims. (Cl. 242—54.1)

ABSTRACT OF THE DISCLOSURE

A reciprocating carriage for a guide for layering wire in a magnetic wire recording mechanism slides on a rotatable shaft cut with opposite handed helical grooves. A pivoted peg on the carriage engages in the grooves. A pivoted bridge on the carriage carries quarter-nuts which are alternatively engageable respectively with one or other of the grooves. The peg is constrained to follow one or other of the grooves depending on which quarter nut is engaged. The quarter nuts are tapered and engage with a form of lateral wedging action in the grooves to avoid "chatter" of the carriage under vibration.

---

The invention relates to drive reversing mechanisms.

The invention provides a drive reversing mechanism comprising two intersecting helical guideway tracks, a track-follower shaped for following either of the tracks to be driven therealong, auxiliary track-following means adjustable between two alternative conditions in which it causes the track-follower to follow one or the other of the tracks respectively, changeover means which cause the auxiliary track-following means to change from one of its said conditions to the other at at least one limit of travel of the track follower, the engagement between the auxiliary track following means and track being comprised by a projecting part received in a grooved part, there being provided resilient means which urge the projecting part and the grooved part into interengagement, opposed side walls of one of the parts being inclined to cause the side walls of the projecting part to engage, under the action of the said resilient means, firmly between the side walls of the grooved part.

Preferably the two helical guideway tracks are formed on a shaft which is rotatable relative to the track-follower, the helical guideway tracks being respectively of opposite sense whereby for rotation of the shaft in one sense the track follower and the shaft move relatively in one direction of the axis of the shaft when the track-follower is caused to follow one of the tracks, and in the opposite direction when the track-follower is caused to follow the other of the tracks, the auxiliary track following means comprising two part-nut members mounted for alternative engagement of one part-nut member with one track or the other part-nut member with the other track, each of the said part-nut members, when engaging track, engaging a length of track greater than the length of the track which is intersected by the other track at any of the said intersections of the tracks.

Preferably the helical guideway tracks are comprised respectively by right and left-handed helical grooves, and projecting parts are provided on the part-nut members for engagement in the respective grooves, the said inclined side walls being provided on the projecting parts which are thereby tapered for the aforesaid firm engagement between the side walls of the respective grooves.

Preferably the part-nut members are mounted on a pivoted bridge member.

Preferably the resilient means comprise a spring which operates on the pivoted bridge with a toggle action, whereby the spring urges the bridge member, when tilted in one sense about its pivot from a position in which neither part-nut member engages track, to rotate in the said one sense, thereby to bias one part-nut member into engagement with one track, and the spring urges the bridge member, when tilted in the opposite sense from the said position, to rotate in the said opposite sense thereby to bias the other part-nut member into engagement with the other track.

Preferably the changeover means comprise at least one movable changeover member coupled to the bridge member, and a stop which engages the changeover member at the said limit of travel and moves the changeover member, thereby to cause the bridge member to rotate to disengage one part-nut member and engage the other part-nut member.

The invention includes a drive reversing mechanism as aforesaid incorporated in a magnetic recording mechanism comprising two reels on which is wound an extended magnetisable member which is fed through the recording mechanism off one reel and onto the other, there being provided a guide through which the member is fed, the guide being coupled to the drive reversing mechanism thereby to be reciprocated and to cause the wire to form into, and run easily from, even axially extending layers on the reels.

Specific constructions of drive reversing mechanism embodying the invention will now be described by way of example and with reference to the accompanying drawings in which:

FIGURE 1 is a side view of the drive reversing mechanism,

FIGURE 2 is a plan view of the mechanism shown in FIGURE 1,

FIGURE 3 is a view from the other side of that mechanism,

Figure 8:
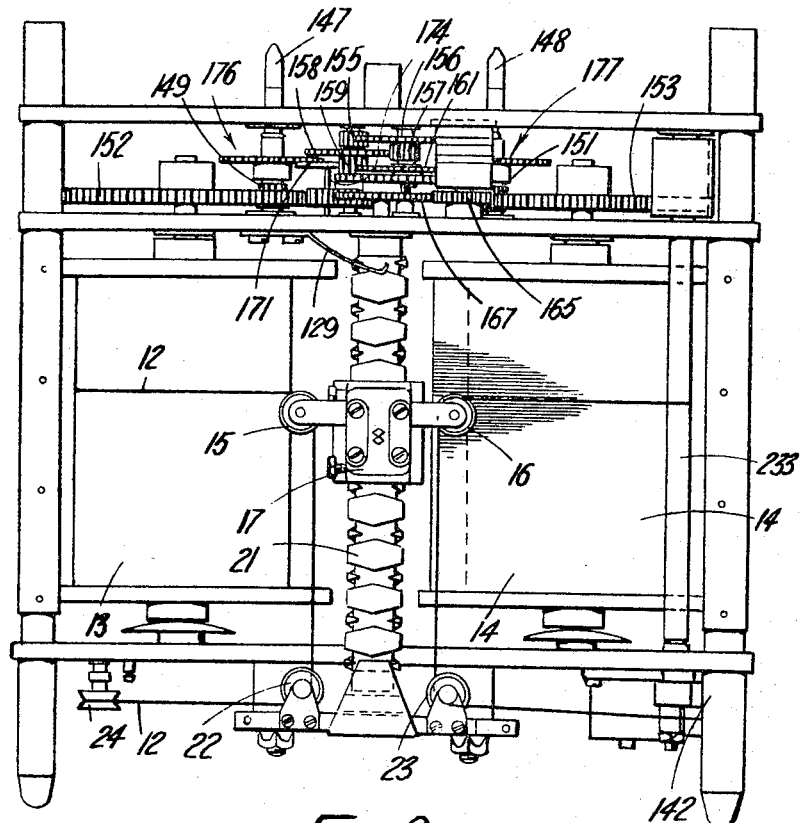
Figure 9:
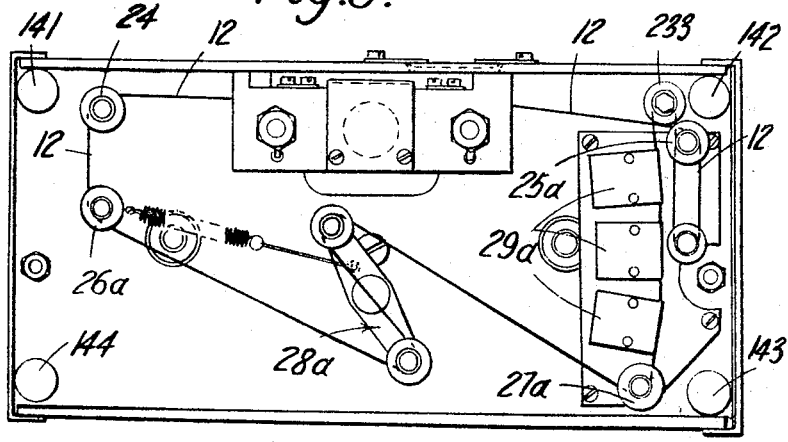
Figure 10:
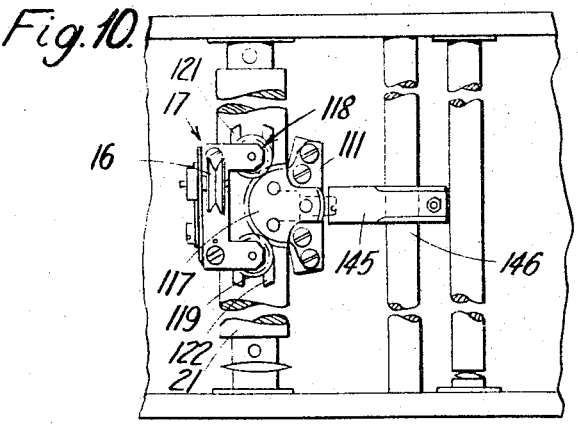
Figure 11:
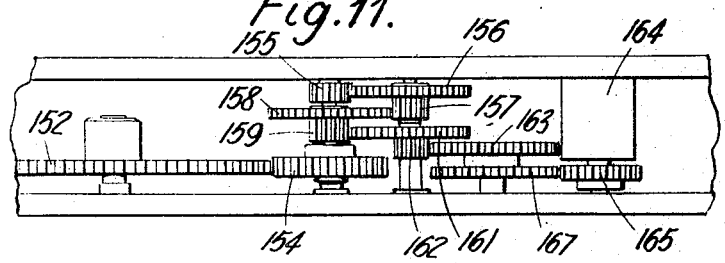
Figure 12:
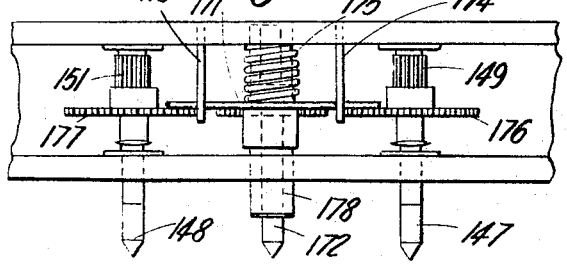

FIGURE 4 is a side view similar to FIGURE 1 showing a stage in the operation of that mechanism, FIGURE 5 is an end view of that mechanism, FIGURE 6 is a view from below of part of that mechanism, FIGURE 7 is an enlarged sectional view of part of that mechanism, FIGURE 8 is a plan view of the drive reversing mechanism shown in FIGURES 1 to 7 incorporated in a magnetic wire recording mechanism, FIGURE 9 is an end view of the mechanism shown in FIGURE 8, FIGURE 10 is a view of part of the mechanism on the line A—A in FIGURE 8, FIGURE 11 is an expanded view of part of FIGURE 8, FIGURE 12 is an enlarged view of another part of the mechanism shown in FIGURE 8, FIGURE 13 is a plan view of a casing for enclosing the wire recording mechanism shown in FIGURES 8 to 12.

FIGURE 14 is an end view of the casing shown in FIGURE 13, and

FIGURE 15 is a side view of the casing, partly dismantled, shown in FIGURE 13.

In the example shown in FIGURES 1 to 7, a carriage 17 is mounted on a shaft 21 and a cylindrical follower peg 32a fixed to the carriage 17, projects into grooves 33, 34 cut in the shaft 21. The grooves 33, 34 respectively form screw threads of opposite sense in the shaft 21 so that if the shaft is rotated the carriage 17 is driven in one axial direction of the shaft when the peg 32a engages with one groove and in the opposite direction when the peg 32a engages with the other groove.

In this example auxiliary track-followers comprise quarter nuts 37a and 38a, (see FIGURES 2, 5 and 6).

The quarter nuts are mounted respectively at each end of a pivoted bridge member 111. The bridge member 111 is formed from two spaced T shaped arms 112, 113 joined together by cross members 114, 115. The bridge member 111 is pivoted to the carriage 7 on a shaft 116 and the quarter nuts 37a and 38a are mounted respectively on the cross members 115 and 114.

Mounted on one end of the shaft 116 is a toothed wheel 117 which is fixed to the bridge member 111. The toothed wheel 117 is engaged by two smaller toothed wheels 118, 119 rotatably mounted respectively at each end of the carriage 17. Fixed to each of the smaller toothed wheels 118, 119 respectively are slotted arms 121, 122 which project respectively from each end of the carriage.

On the side of the carriage 17 remote from the toothed wheels is mounted a toggle spring 123 which engages in hooked projections 124, 125 mounted on the arm 113 of the bridge member 111.

As best seen in FIGURES 2 and 6 the quarter nut 37a is lined up to engage with the helical groove 33 in the shaft 21 and the other quarter nut 38a is lined up to engage in the other helical groove 34 of the shaft 21. The pivot at 116 and the quarter nuts are so positioned on the bridge member 111 that it is not possible to have both of the quarter nuts tending to engage in their respective grooves at the same time.

As shown in FIGURE 3, the toggle spring urges the bridge member 111 to move either into a position is moved along the shaft in one direction or the other depending on which quarter nut is in engagement with its respective groove. Thus if the carriage travels in the direction of Arrow A (FIGURES 1 and 2) when the quarter nut 38a engages the groove 34, then, for the same sense of rotation of the shaft 21, the carriage travels in the direction of arrow B (FIGURE 3) when the quarter nut 37a engages the groove 33. The quarter nuts engage with a sufficient length of groove to avoid the possibility of jamming by tending to move into the other groove at the points where the grooves 33, 34 cross.

At the position along the shaft 21 where it is desired to reverse the travel of the carriage 17 a peg 126 (see FIGURE 4) is fixed projecting from the shaft 21 in such a position that, as the carriage moves towards the peg 126, the peg 126 engages the slot 127 in the slotted arm 122 on the toothed wheel 119. When the peg 126 engages in the slot 127 the rotation of the shaft 21 causes rotation of the toothed wheels and consequently rotation of the bridge member 111 about the shaft 116. In this way the bridge member 111 is rocked and the quarter nut 37a which was in engagement with its respective groove 33 is moved out of engagement with that groove. For a small amount of travel at this moment of rocking of the bridge member the carriage is driven by the follower peg 32a alone until sufficient further movement of the toothed wheels by the peg 126 causes engagement of the other quarter nut 38a with the groove 34. The toggle spring 123 ensures that the bridge member rocks over to change the engagement of the quarter nuts with a positive action.

A corresponding peg (not shown) in the shaft 21 causes reversal of the carriage 17 at the other limit of its travel by a corresponding co-operation with the slot 128 in the slotted arm 121 on the other small toothed wheel 118.

In order to urge the follower peg 32a to change from one groove to the other at the moment when the bridge member is rocked for the carriage reversal, a buffer return spring 129 is provided near the point at which the carriage reversal occurs. The carriage 17 moves into abutment with the buffer spring just before the peg 126 engages in the slot 127 of the arm 122. The buffer spring is thus compressed and applies pressure to the carriage which urges the follower peg 32a to change grooves when the bridge member rocks.

As illustrated in FIGURE 7, the parts of the quarter nuts which engage in the track grooves are tapered and arranged to engage, under the action of the toggle spring 123, firmly with the side walls of the grooves, i.e. the quarter nuts do not bottom at the crest and depth of the grooves. In this example the pressure angle of the tapered side walls of the quarter nuts with the side walls of the track grooves is about 20 degrees.

In this example the follower peg 32a, which has a circular cross section, has a clearance in the grooves of a few thousandths of an inch. This clearance has been found necessary for enabling the reversal to occur. In this example unwanted movement due to this clearance when the mechanism is subjected to vibration is avoided or reduced between the limits of travel of the carriage by the aforesaid firm engagement of the quarter nut side walls with the track groove side walls which firm engagement is in the nature of a "wedging" action, the toggle spring providing the bias and wedging, the operative quarter nut into engagement with the sides of the groove in which it is running. At the moment of reversal this effect of vibration is avoided or reduced by the buffer spring 129 which causes the follower peg 32a to engage firmly with one side of the groove in which it is running.

FIGURES 8 to 15 show a magnetic wire recording mechanism incorporating the drive reversing mechanism of the example shown in FIGURES 1 to 7.

In this example the mechanism is supported on four dowels 141, 142, 143, 144. Magnetic recording wire 12 stored on the reels 13, 14 is wound, when the mechanism is recording, off reel 13 and onto reel 14. The wire 12 is guided by a number of pulleys and, as shown in FIGURES 8 and 9, passes over pulleys 15, 22, 24, 26a, around the two pulleys on a jockey pulley system 28a, over pulley 27a past recording heads 29a, over a rotatable rod 233 around pulley 234, around a tilted pulley 25a, over pulleys 23 and 16, and finally a second time over the rotatable rod 233 and onto the reel 14.

The pulleys 15, 16 are mounted on the carriage 17 which reciprocates on the shaft 21. In this example this drive reversing mechanism is as described with reference to FIGURES 1 to 7, only one buffer spring 129 being shown. The buffer spring which operates at the other limit of travel of the carriage 17 is not shown. FIGURE 10 shows the arrangement of this example by which the carriage 17 is prevented from rotating with the shaft 21. This arrangement comprises a runner arm 145 fixed to the carriage 17. The arm 145 has a hole in it which is a sliding fit on a shaft 146 which is fixed parallel to the shaft 21.

Drive for rotating the various components is provided from two motors in a drive unit (not shown). This drive unit is clamped onto the recording mechanism so that one motor, which is a servo motor, is coupled to a coupling member 147, and the other motor, which is a synchronous motor, is coupled to a coupling member 148.

The reel 13 and the shaft 21 are driven from the coupling member 147 via a gear train which is shown expanded in FIGURE 11. The reel 14 is separately driven from the coupling member 148 via a second gear train. The servo motor driving coupling member 147 is controlled by the jockey pulley system 28a in such a manner as to tend to maintain constant tension on the wire 12.

The coupling members 147, 148 are directly coupled by pinions 149, 151 respectively to the gear wheels 152, 153 fixed to the axle shafts of the reels 13, 14.

FIGURE 11 shows the reducing train of gears 154, 155, 156, 157, 158, 159, 161, 162, 163, 164, 165, 167, driven from the gear wheel 152. The shaft 21 is secured to rotate with the last gear wheel 167 in the train.

A braking device, shown enlarged in FIGURE 12, is provided to restrain the reels from accidentally unravelling wire when the mechanism is not clamped to the drive unit. The braking device comprises a friction disc 171 slidably mounted on a shaft 172 and prevented from rotating by spokes 173, 174. The friction disc 171 is urged by a coil spring 175 into engagement with co-operating friction discs 176, 177 fixed to the shafts on the coupling members 147, 148 respectively. An annular stub shaft 178 around the shaft 172 and fixed to the friction disc 171 projects from the base plate of the recording mechanism. The drive unit is arranged to press on this stub shaft 178 and move the friction disc 171 out of engagement with the co-operating friction discs 176, 177 against the action of the spring 175 when the drive unit is clamped onto the recording mechanism.

FIGURES 13 to 15 show the magnetic wire recording mechanism enclosed in a casing 181 which is located on the dowels 141, 142, 143, 144. One end 182 of the casing has guards 183, 184, 185 which surround respectively the coupling members 147, 148 and the stub shaft 178 of the braking device. The other end 186 of the casing supports a bayonet fitting 187 for electrically connecting the recording mechanisms to the network which is to supply signals to be recorded. FIGURE 15 illustrates how the cable 188 leading from the bayonet fitting 187 into the recording mechanism is supported in the casing 181. The end 183 of the casing also supports an inspection window 189 and a name plate 191.

The invention is not restricted to the details of the foregoing examples. For instance the drive reversing mechanism need not necessarily be used with a magnetic wire recording mechanism but may, for example, be used for winding tape or ribbon onto drums, or fishing reels. The wire need not necessarily be guided directly by the carriage but may, for example, be guided by a pivoted lever arm attached to the carriage.

The follower peg need not necessarily be of circular cross-section but may for example have a diamond shaped cross-section.

We claim:

1. A drive reversing mechanism comprising two helical guideway tracks having intersections one with the other, a track-follower engageable with either of the tracks, drive means for effecting relative movement of the track and track-follower, auxiliary track-following means having two alternative conditions, coupling means coupling the auxiliary track-following means to the track-follower to cause the track-follower to follow one of the tracks when the auxiliary track-following means is in one condition and to follow the other track when the auxiliary track-following means is in the other condition, changeover means for changing the auxiliary track-following means from one of its said conditions to the other at at least one limit of travel of the track-follower, the auxiliary track following means comprising a projecting part and a grooved part having a groove, the projecting part being received in the groove, and biassing means biassing the projecting part into the groove, one of the parts having tapered side walls, the side walls of the projecting part engaging against the side walls of the grooved part and the taper of the said tapered side walls limiting penetration of the projecting part into the grooved part to less than the depth of the groove part, whereby under the action of the biassing means the projecting part engages firmly between the side walls of the grooved part.

2. A drive reversing mechanism as claimed in claim 1, in which the two helical guideway tracks are formed on a shaft which is rotatable relative to the track-follower, the helical guideway tracks being respectively of opposite sense whereby for rotation of the shaft in one sense when the auxiliary track-following means is in the said one condition the track-follower and the shaft move relatively in one direction of the axis of the shaft and when the auxiliary track-following means is changed over into the said other condition the track-follower and the shaft move axially relatively in the opposite direction, the auxiliary track-following means comprising two part-nut members mounted for alternative engagement of one part-nut member with one track or the other part-nut member with the other track, the track length engagement length of each of the said part-nut members being greater than the length of intersection of the track by the other track at any of the said intersections of the tracks.

3. A drive reversing mechanism as claimed in claim 2, in which the helical guideway tracks are comprised respectively by right and left handed helical grooves, and the part-nut members comprise projecting parts engageable in the respective grooves, the said tapered side walls being provided on the projecting parts.

4. A drive reversing mechanism as claimed in claim 2, in which the part-nut members are mounted on a pivoted bridge member.

5. A drive reversing mechanism as claimed in claim 4, in which the resilient means comprise a toggle acting spring connected to operate on the pivoted bridge with a toggle action in which the bridge member is movable over-centre to be biassed alternatively by the spring into a first position in which one part-nut member engages with one track, or a second position in which the other part-nut engages with the other track.

6. A drive reversing mechanism as claimed in claim 5, in which the changeover means comprise at least one movable changeover member coupled to the bridge member to rotate the bridge member when moved and a stop which engages the changeover member at the said limit of travel and moves the changeover member, whereby the bridge member is rotated over-centre to disengage one part-nut member and engage the other part-nut member.

7. A drive reversing mechanism, as claimed in claim 1, incorporated in a magnetic recording mechanism comprising two reels on which is wound an extended magnetisable member which is fed through the recording mechanism off one reel and onto the other, there being provided a guide through which the member is fed, the guide being coupled to the drive reversing mechanism thereby to be reciprocated and to cause the wire to form into, and run easily from, even axially extending layers on the reels.

8. A magnetic recording mechanism as claimed in claim 7, in which the extended magnetisable member comprises magnetisable wire.

References Cited

UNITED STATES PATENTS

| | | | |
|---|---|---|---|
| 2,598,716 | 6/1952 | Nygaard | 242—158.3 X |
| 2,714,998 | 8/1955 | Guilbert | 242—158.3 |

LEONARD D. CHRISTIAN, *Primary Examiner.*